April 19, 1955     W. A. STOTT     2,706,536
HYDRAULIC TRAILER BRAKE ACTUATING HITCH
Filed Jan. 29, 1954     2 Sheets-Sheet 1
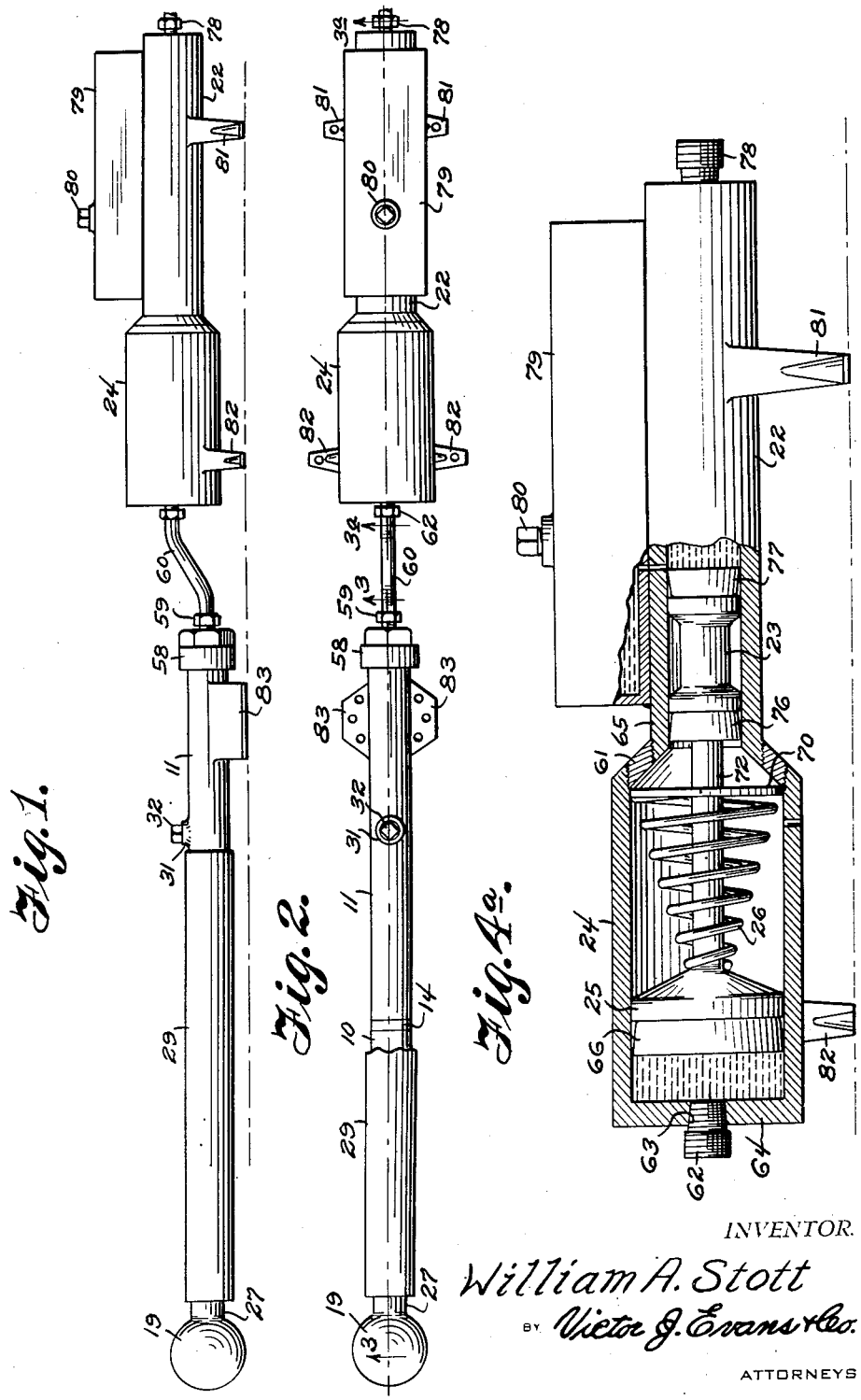
INVENTOR.
William A. Stott
BY Victor J. Evans & Co.
ATTORNEYS

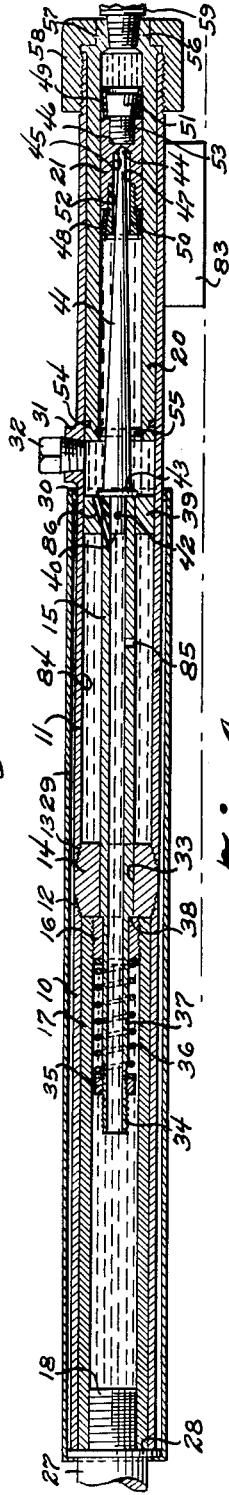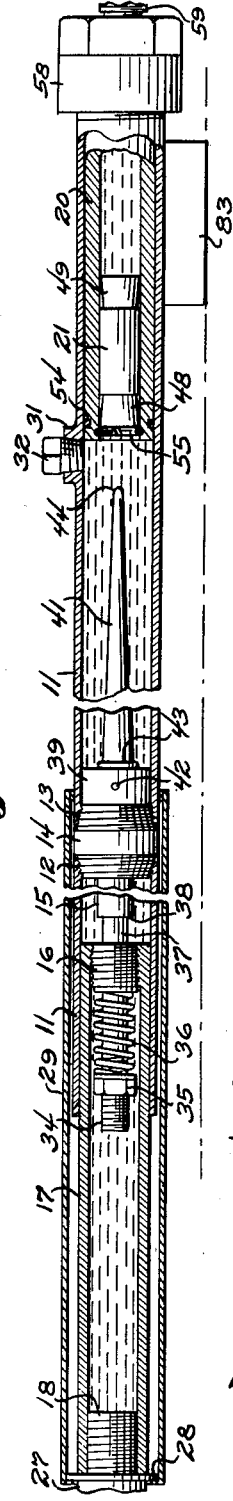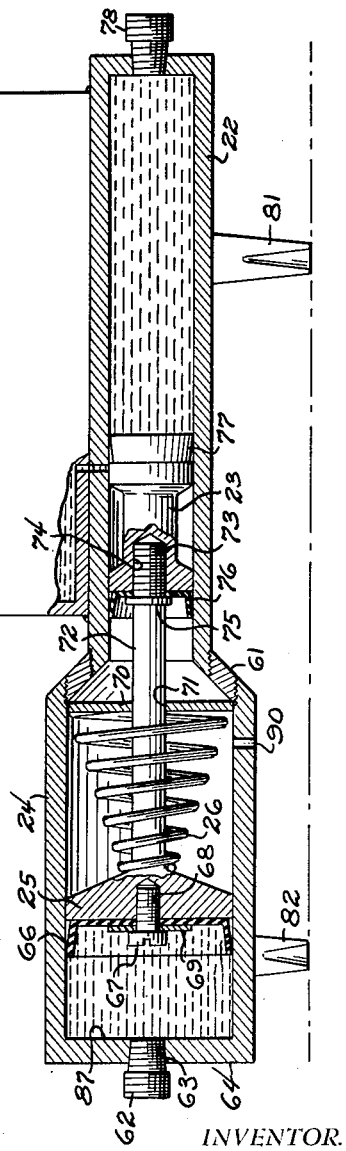

United States Patent Office 2,706,536
Patented Apr. 19, 1955

2,706,536

HYDRAULIC TRAILER BRAKE ACTUATING HITCH

William A. Stott, Taft, Calif.

Application January 29, 1954, Serial No. 407,063

2 Claims. (Cl. 188—112)

The invention relates to hitches used for connecting trailers to towing vehicles, and in particular a telescoping tubular element in combination with the master cylinder of a brake system of a trailer wherein with the telescoping tubular element and brake cylinder mounted on a trailer with the tubular element positioned whereby a ball on the forward end thereof is adapted to be connected to a towing vehicle the length of the telescoping cylinder or tubular element will be extended upon the application of force by the towing vehicle with the extending movement which releases the brakes of the trailer being retarded by fluid passing through a by-pass or restricted passage and the return or contracting movement of the tubular element will also be restricted by the return passage of fluid between sections of the elements, whereby cushioning means is provided; and wherein the movement of the towing vehicle in the reverse direction actuates the master cylinder to apply brakes of the trailer.

The purpose of this invention is to prevent shock loads being applied to a trailer by a towing vehicle and also to provide means for setting the brake of a trailer by the movement of a towing vehicle.

With the conventional type of trailer hitch springs are provided for resiliency and particularly for preventing shock loads being transmitted direct to the trailer. However, with conventional hitches of this type it is difficult to provide cushioning means for the return movement when the distance between the trailer and towing vehicle is reduced or when the vehicle stops, and with this thought in mind this invention contemplates providing a hydraulic cylinder in a hitch whereby the forward and return movements of members in the hitch are restricted by passage of fluid in the hitch through a relatively small opening and wherein upon the return movement in the contracting action of the hitch the brakes of a towed vehicle or trailer are automatically applied.

The object of this invention is, therefore, to provide a hydraulic hitch in which the extensible action of the hitch causes fluid to pass from one section of the hitch to another through a restricted passage and wherein in the return movement the travel of members of the hitch is also restricted by the passage of the fluid through the comparatively small openings.

Another object of the invention is to provide a hydraulic hitch for connecting a trailer to a towing vehicle through a booster and master cylinder in which upon rearward movement of the towing vehicle the brakes of the trailer or towed vehicle are automatically set and the force is greatly multiplied at the brake end of the hitch.

A further object of the invention is to provide a hydraulically actuated hitch for connecting a towing vehicle to a trailer in which forward and reverse movements of the vehicles are restricted by the passage of fluid through apertures, and also in which movement of the towing vehicle toward the trailer sets the brakes of the trailer in which the hitch is of a comparatively simple and economical construction.

With these and other objects and advantages in view the invention embodies an elongated tubular housing having sections secured to a coupling collar on a center tube with a ball extended from one end of an inner tube connected to a bushing on the center tube and also to an outer sleeve providing a cover, and in which the inner end of the center tube is provided with a finger adapted to retain a piston in an inner cylinder in such a position that a passage between the housing and a pressure cylinder is closed, and in which a piston in the pressure cylinder is connected to a piston in a master cylinder of a brake system of a trailer upon which the hitch is mounted.

Other features and advantages of the invention will appear from the following description taken in connection with the drawings, wherein:

Figure 1 is a side elevational view illustrating a complete assembly of the hydraulically actuated trailer hitch showing the parts in operative positions.

Figure 2 is a plan view of the hitch with the parts as shown in Figure 1.

Figure 3 is a longitudinal section through the telescoping tubular portion of the hitch taken on line 3—3 of Figure 2, showing the device with the parts in free positions.

Figure 3a is a similar longitudinal section taken on line 3a—3a of Figure 2 showing the connection of the device to the master cylinder of the brake system of the trailer, the parts being shown on an enlarged scale.

Figure 4 is a longitudinal section through the device being substantially the same as that shown in Figure 3 and showing the positions of the parts with force applied to the ball at the extended end of the tubular element whereby the coupling collar with the tubes connected thereto is moved forwardly.

Figure 4a is a side elevational view of the master cylinder, similar to that shown in Figure 3a with parts broken away showing a pressure cylinder positioned between the telescoping tubes and master cylinder, the parts also being shown on an enlarged scale.

Referring now to the drawings wherein like reference characters denote corresponding parts the improved hydraulic trailer hitch of this invention includes elongated tubular sections 10 and 11 threaded on threaded portions 12 and 13, respectively, of a collar 14 a center tube 15 slidably mounted in the collar 14 and having a bushing 16 mounted on the forward end, a tube 17, threaded at one end on the bushing 16 and at the opposite or forward end on a stud 18 which extends from a ball 19, an inner cylinder 20 having a floating piston 21 therein, a master cylinder 22 having a piston 23 therein, and a connecting cylinder 24 having a piston 25 and a spring 26 therein.

The ball 19 is mounted on a base 27 from which the stud 18 extends, and, as shown in Figure 3 the base is provided with a flange 28 that is positioned to abut the end of the tube 10. A sleeve 29, providing a housing is mounted on the flange 28 and, as shown in Figure 3 the sleeve 29 extends to a point 30, which is spaced from a boss 31 in which a filling plug 32 is threaded.

The coupling collar 14 is provided with a bore 33 through which the center tube 15 extends and, also as shown in Figure 3 the forward end of the tube 15 is provided with threads 34 on which a collar 35 is threaded, the collar providing a stop for a spring 36 and also providing means for adjusting the tension of the spring. The section 37 of the tube 15 on which the threaded end 34 is positioned is of a smaller diameter than the outside diameter of the tube whereby a shoulder 38 is provided which forms a stop for the bushing 16. The opposite end of the tube 15 is provided with a piston or stop 39 in which a stem 40 of a finger 41 is held by a pin 42. The base of the pin 41 is provided with a collar 43 and the opposite end of the finger is provided with a point 44 that is positioned to extend into a recess 45 in a transverse partition 46 to provide means for moving the body of the piston 21 rearwardly by the finger which extends into the bore 47 of the piston. Cup shaped washers 48 and 49 are provided at the ends of the piston 21 and the washers are secured in position with threaded tubular elements 50 and 51, respectively, that are threaded into bores 52 and 53 in the ends of the piston.

As noted in Figure 3 the pin 42 extends through the tube 15, piston or stop 39, and stem 40, holding the three parts together.

The trailing end of the tube 11 is provided with an inner cylinder 20 that is provided with a sealing ring 54 and a spring locking ring 55 in the forward end, and the opposite end is provided with a boss 56 that extends through an opening 57 in a cap 58 that is threaded on the end of the tube 11.

The spring locking ring 55 prevents accidental displacement of the piston 21 from the cylinder.

The fitting 59, which is threaded into the opening 56 of the cylinder 20 provides means for connecting a tube 60 from the telescoping tubular element to the cylinder 24 in which the piston 25 is positioned and this cylinder is connected by an adapter ring 61 to the master cylinder 22 of the brake system of the trailer.

The tube 60 is connected to a fitting 62 in an opening 63 in an end 64 of the cylinder 24 and the adapter ring 61, which may be threaded in the end of the cylinder 24, may also be threaded on the end 65 of the master cylinder 22.

The piston 25 is also provided with a cup washer 66 that is secured by a screw 67 to the piston, the screw being threaded into an opening 68 and having a washer 69 between the head and cup washer. The cylinder 24 is provided with a disc 70 that provides a seat for the spring 26 and the disc is provided with an opening 71 through which a piston rod 72, which in integral with the piston 25, extends. The piston rod is provided with a threaded end 73 that extends into the body of the piston 23 and, as shown in Figure 3a, the threaded end is threaded into a socket 74. The piston rod 72 is also provided with a collar 75 which retains a cup washer 76 in position against the end of the piston. The opposite end of the piston is provided with a similar cup washer 77. The opposite end of the cylinder 22 is provided with a fitting 78 for connecting the cylinder to the brake system of the trailer. The master cylinder 22 is provided with a reservoir 79 and the reservoir is provided with a filling plug 80.

With the parts assembled as shown and described the device is mounted on the floor or other part of a trailer with legs 81 extended from the cylinder 22 and similar legs, as indicated by the numeral 82 extended from the cylinder 24. The telescoping tubular elements are provided with supporting flanges 83 which extend from the tube 11 as shown in Figures 1 and 2.

With the assembled unit supported, such as being bolted to the floor of a trailer and with the ball 19 secured in a socket of a conventional hitch or a towing vehicle a forward force, pulling on the ball and tube 17 draws the bushing 16 forwardly, with the spring 36 drawing the tube 15 and finger 41 forwardly from the position shown in Figure 3 to that shown in Figure 4. In this movement fluid passes from a chamber 84 between the collar 14 and stop 39 through an opening 85 in the tube 15, through the tube 15 and through an escape opening 86 in the stop 39 whereby the fluid passes into the area in the inner cylinder 20. Upon forward travel of the tube 15 the opening 85 passes into the coupling collar 14, thereby closing the opening and increasing the cushioning action in the hitch.

In this movement the finger 41 is drawn forwardly relieving the piston 21 and fluid from a chamber 87 in the cylinder 24 passes through the connection 60 into the cylinder 20 driving the piston 21 forward to the position shown in Figure 4. With the fluid passing through the restricted openings 85 and 86 the forward and return movements of the coupling collar 14 and associated parts of the hitch are restricted whereby fluid in the device provides cushioning means preventing shock loads being transmitted against rigid parts of the hitch.

In the return movement the finger 41 drives the piston 21 rearwardly forcing fluid from the cylinder 20 through the connection 60 into the chamber 87 supplying pressure through the piston 23 to fluid in the master cylinder 22 whereby the brakes are applied, and with the diameter of the piston 25 much larger than that of the piston 23, a much greater force is applied to the fluid in the master cylinder 22 so that the brakes are applied with multiplied power.

The cylinder 24 is provided with a vent 90 to permit travel of the piston toward the master cylinder.

It will be understood that modifications, within the scope of the appended claims, may be made in the design and arrangement of the parts without departing from the spirit of the invention.

It will also be understood that this hydraulic or fluid actuated trailer hitch and brake unit may be mounted in any suitable position upon a trailer such as on the front, rear, or on the sides or under surface of the floor or in the cabin and the unit may be connected to hydraulic, mechanical, vacuum or air brake systems.

What is claimed is:

1. In a hydraulic trailer hitch, the combination which comprises a coupling collar, a center tube extended through and slidably mounted in said coupling collar, a forward tube extended from one side of said coupling collar, a rear tube extended from the opposite side of the coupling collar, a bushing slidably mounted on the center tube, a tube threaded on the bushing and extended to the forward end of the forward tube threaded on the coupling collar, a hitch member carried by the forward end of the tube threaded on the bushing, resilient means for restricting forward movement of the bushing and tube in the end of which the member is carried, a stop carried by the center tube and slidably mounted in the rear tube extending from the coupling collar, a cylinder positioned in the trailing end of the rear tube, a piston in the cylinder in the trailing end of the rear tube, a finger extended from the center tube and positioned to engage the piston, said center tube having an opening through the wall thereof providing communicating means between the interior of the center tube and a volume of fluid between the coupling collar and stop mounted on the center tube and said stop having an outlet passage therethrough, a pressure cylinder connected to the cylinder in the trailing end of the rear tube, a piston in the pressure cylinder, a master cylinder of a brake system of a trailer upon which the hitch is adapted to be mounted connected to the pressure cylinder, a piston in the master cylinder connected by a piston rod to the piston in the pressure cylinder, and resilient means in the pressure cylinder for urging the piston therein forwardly upon the application of a forward force to the member of the hitch whereby brakes of the trailer are released and wherein upon the release of said forward force the piston in the cylinder in the trailing end of the rear tube is forced rearwardly by said finger forcing fluid from the cylinder into the pressure cylinder thereby actuating the master cylinder of the brake system to apply the brakes of the trailer.

2. In a hydraulic trailer hitch, the combination which comprises a coupling collar, a center tube extended through and slidably mounted in said coupling collar, a forward tube extended from one side of the coupling collar, a rear tube extended from the opposite side of the coupling collar, a bushing slidably mounted on the center tube, a tube threaded on the bushing and extended to the forward end of the forward tube threaded on the coupling collar, a hitch member carried by the forward end of the tube threaded on the bushing, resilient means for restricting forward movement of the bushing and tube in the end of which the member is carried, a stop carried by the center tube and slidably mounted in the rear tube extending from the coupling collar, a cylinder positioned in the trailing end of the rear tube, a piston in the cylinder in the trailing end of the rear tube, a finger extended from the center tube and positioned to engage the piston, said center tube having an aperture through the wall thereof providing communicating means between the interior of the center tube and a volume of fluid between the coupling collar and stop mounted on the center tube and said stop having an outlet aperture therethrough, a pressure cylinder connected to the cylinder in the trailing end of the rear tube, a piston in the pressure cylinder, a master cylinder of a brake system of a trailer upon which the hitch is adapted to be mounted connected to the pressure cylinder, a piston in the master cylinder connected by a piston rod to the piston in the pressure cylinder, and resilient means in the pressure cylinder for urging the piston therein forwardly upon the application of a forward force to the member of the hitch whereby brakes of the trailer are released and wherein upon the release of said forward force the piston in the cylinder in the trailing end of the rear tube is forced rearwardly by said finger forcing fluid from the cylinder into the pressure cylinder thereby actuating the master cylinder of the brake system to apply the brakes of the trailer, said apertures in the center tube and stop carried thereby providing restricted passages for cushioning both forward and reverse movements of the hitch member.

References Cited in the file of this patent

UNITED STATES PATENTS

| | | |
|---|---|---|
| 1,896,427 | Selvester | Feb. 7, 1933 |
| 2,149,189 | Shaffer | Feb. 28, 1939 |
| 2,162,029 | Paul, Jr. | June 13, 1939 |